United States Patent
Brooks et al.

(10) Patent No.: US 8,380,328 B2
(45) Date of Patent: Feb. 19, 2013

(54) METHOD AND SYSTEM FOR MONITORING AND CONTROLLING A MULTI-VARIABLE PROCESS THROUGHOUT A PLURALITY OF DISTINCT PHASES OF THE PROCESS

(75) Inventors: Robin William Brooks, Buckinghamshire (GB); John Gavin Wilson, London (GB); Na Zhao, Slough (GB)

(73) Assignee: Process Plant Computing Limited, Pinner, Middlesex (GB)

( * ) Notice: Subject to any disclaimer, the term of this patent is extended or adjusted under 35 U.S.C. 154(b) by 180 days.

(21) Appl. No.: 12/678,202

(22) PCT Filed: Sep. 15, 2008

(86) PCT No.: PCT/GB2008/003105
§ 371 (c)(1),
(2), (4) Date: Mar. 15, 2010

(87) PCT Pub. No.: WO2009/034345
PCT Pub. Date: Mar. 19, 2009

(65) Prior Publication Data
US 2010/0198369 A1    Aug. 5, 2010

(30) Foreign Application Priority Data
Sep. 15, 2007 (GB) .................... 0717991.4

(51) Int. Cl.
*G05B 13/02* (2006.01)
(52) U.S. Cl. .............................. 700/33; 700/29; 702/189
(58) Field of Classification Search .................... 700/29, 700/33; 702/189
See application file for complete search history.

(56) References Cited

U.S. PATENT DOCUMENTS

| | | | |
|---|---|---|---|
| 6,577,323 B1 * | 6/2003 | Jamieson et al. | 715/700 |
| 6,587,108 B1 * | 7/2003 | Guerlain et al. | 345/440 |
| 6,609,036 B1 | 8/2003 | Bickford | |
| 7,409,321 B2 * | 8/2008 | Repucci et al. | 702/189 |
| 2003/0191561 A1 * | 10/2003 | Vos | 701/3 |
| 2006/0058898 A1 * | 3/2006 | Emigholz et al. | 700/29 |
| 2007/0015078 A1 | 1/2007 | Suzuki et al. | |
| 2007/0124113 A1 | 5/2007 | Foslien et al. | |

FOREIGN PATENT DOCUMENTS

| | | |
|---|---|---|
| GB | 2363647 | 1/2002 |
| GB | 2378527 | 2/2003 |

(Continued)

*Primary Examiner* — Mohammad Ali
*Assistant Examiner* — Anthony Whittington
(74) *Attorney, Agent, or Firm* — Davis & Bujold, P.L.L.C.

(57) ABSTRACT

A control of a multi-variable process throughout a plurality of successive, distinct operational phases of the process involves accumulation of sets of values of the process and quality variables (a-j) from previous multiple operations of the process through all its phases, as respective datasets of a historical record. Each dataset includes an identifier (p) of the phase to which it relates. The current values of the applicable process variables (Qa-Qh) during each phase and the phase identifier (p) are indicated on respective axes (Xp,Xa-Xh) of a multi-dimensional display in relation to an operational envelope which defines bounds (UL,LL) for the values of the individual process and quality variables (a-j) relevant to that phase and which is derived from the datasets of the historical record identified with that phase. Changes in the current process variables (Qa-Qh) result in changes of the bounds (UL,LL), and alarm is given when a current value departs from within them. Either manually or automatically correction of an alarm condition is made in accordance with calculation of required change of value of one or more manipulatable process variables (a-c).

20 Claims, 8 Drawing Sheets

FOREIGN PATENT DOCUMENTS

| | | |
|---|---|---|
| GB | 2391085 | 1/2004 |
| GB | 2428818 | 2/2007 |
| WO | 0005013 | 2/2000 |
| WO | 03023687 | 3/2003 |

* cited by examiner

METHOD AND SYSTEM FOR MONITORING AND CONTROLLING A MULTI-VARIABLE PROCESS THROUGHOUT A PLURALITY OF DISTINCT PHASES OF THE PROCESS

This application is a national stage completion of PCT/GB2008/003105 filed on Sep. 15, 2008 which claims priority from British Application Serial No. 0717991.4 filed on Sep. 15, 2007.

FIELD OF THE INVENTION

This invention relates to multi-variable operations.

BACKGROUND OF THE INVENTION

The invention is particularly concerned with methods of operating a controllable multi-variable process and systems for use in the operation of such a process. Methods and systems of this kind are described in GB-A-2 363 647 and GB-A-2 378 527 in which a multi-dimensional display representation of the variables is derived according to individual, parallel or other spaced coordinate axes. The variables of the process are of two kinds, namely, process variables, of which the current values are generally-available during process operation, and quality-variables, of which the values are generally determined later by laboratory or similar measurement or analysis. A boundary or envelope for prospective operation of the process is defined within the system of axes in accordance with sets of values for the process and quality variables accumulated as a historical record of a multiplicity of previous, satisfactory operations of the process. Each previous operation is defined as a respective datapoint consisting of a set of values for the individual process and quality variables applicable to that operation.

The method and system described in GB-A-2 378 527 involves the calculation and use of an envelope termed the BOZ, representing the best operating zone of the process. The BOZ is calculated from a selected, limited group of the historical record of datapoints so the envelope of the BOZ lies wholly within the outer, boundary envelope derived from the full historical record. The two envelopes are used for different purposes in the known methods and systems, the outer envelope for the purpose of revealing the region within which operation of the process may take place satisfactorily within the bounds of past experience. The envelope of the BOZ, on the other hand, establishes the ranges of the individual process variables that are applicable to realisation of 'good' results and provides a prediction of the ranges of the quality-variables that can be expected to be achieved.

The methods and systems as known from the above references are applicable to the control (whether direct or indirect) of, for example, industrial manufacturing or processing operations carried out as continuous or single-phase processes. It is an object of the present invention to provide a method of operating a controllable multi-variable process, and a system for use in the operation of such a process, that are of wider applicability.

SUMMARY OF THE INVENTION

According to one aspect of the present invention there is provided a method for control of a multi-variable process throughout a plurality of successive, distinct phases of the process, wherein sets of values of the process and quality variables from previous multiple operations of the process through all the phases are accumulated as respective datasets of a historical record, the current values of the process variables applicable to the current phase of the process are indicated on respective axes of a multi-dimensional display representation of those variables according to individual coordinate axes, the current values of the applicable process variables being indicated on their respective axes in relation to an operational envelope which defines bounds for the values of the individual process variables relevant to that phase and which is derived from the datasets of the historical record relevant to that phase, and wherein the process is controlled through each successive phase in dependence upon the bounds defined by the operational envelope for the process variables relevant to that phase.

According to another aspect of the present invention a system for control of a multi-variable process throughout a plurality of successive, distinct phases of the process, comprises means for accumulating sets of values of the process and quality variables from previous multiple operations of the process through all the phases are accumulated as respective datasets of a historical record, means for providing a multi-dimensional display of current values of the process variables applicable to the current phase of the process, according to individual coordinate axes, means indicating the current values of the applicable process variables on their respective axes in relation to an operational envelope which defines bounds for the values of the individual process variables relevant to that phase and which is derived from the datasets of the historical record relevant to that phase, and means controlling the process through each successive phase in dependence upon the bounds defined by the operational envelope for the process variables relevant to that phase.

Industrial processes often involve more than a single phase, in that raw materials go through a number of different operations in sequence to produce the final product; such processes are commonly referred to as plural- or multi-phase batch processes. As a very simple example of batch processing used in the preparation of food, in particular fried potatoes, the potatoes are, in a first phase, washed and scrubbed, are part-boiled in a second phase, and are then fried in a third phase. The variables and their relationships in each phase of this overall operation are different and therefore require different models. Even if the same equipment is used during two or more of the phases, and if the same operations variables, such as pressure and temperature, are measured by the same sensors during different phases, their operational ranges may be distinctly different.

Processing-control of the various phases could be carried out as separate operations, but it would be very time-consuming and tedious for the user to build and subsequently to maintain, and it would not ensure that the model objectives of each phase were necessarily consistent with the overall objective of the plural-phase process. The present invention enables the whole of a plural-phase industrial process to be modelled as a consistent whole. By this, sub-models of the process for the different phases can be automatically established and run sequentially, or separately, as required.

In setting up the method and system of the invention, the user divides the process into its distinct phases; the process may already by its nature be clearly divided, or the user may make the division applying his/her process-engineering analysis of the process. Each phase is numbered and this number becomes an additional variable in the overall model. A table is then created of all the variables (including phase number) that are applicable in the overall process and for what purpose in each individual phase, indicating for each phase whether they are applicable, and if so whether they can be manipulated in that phase Envelope selection is made by the user once for the entire process with sub-sets of envelopes for the individual phases automatically created so as to assure consistency of the objectives of each phase with the objectives of the overall process.

BRIEF DESCRIPTION OF THE DRAWINGS

A method and system according to the present invention will now be described, by way of example, with reference to the accompanying drawings, in which.

DETAILED DESCRIPTION OF THE DRAWINGS

The example of method and system to be described is related to the control of operation of a plural-phase multi-variable process carried out by a basic processing-plant. Details of the plant and its purpose are not of consequence, and indeed the method and system of the invention are related more specifically to operation of the plant as an example of a multi-phase multi-variable process rather than to the purpose of the process performed, being applicable in the generality to any situation involving a multi-phase multi-variable process.

In the context of initial description of the present specific example, there are fourteen variables involved in plant-operation, and of these, eleven are process or control variables to the extent that their values determine the outcome of the process. The remaining three variables are quality variables in the sense that their values define, or more especially are defined by, that outcome. It is to be understood, however, that not all fourteen variable are necessarily involved or relevant in each phase of the process, and that in general the number of process or control variables in particular, may vary from one phase and another depending on the nature of the phase.

Figure 1:
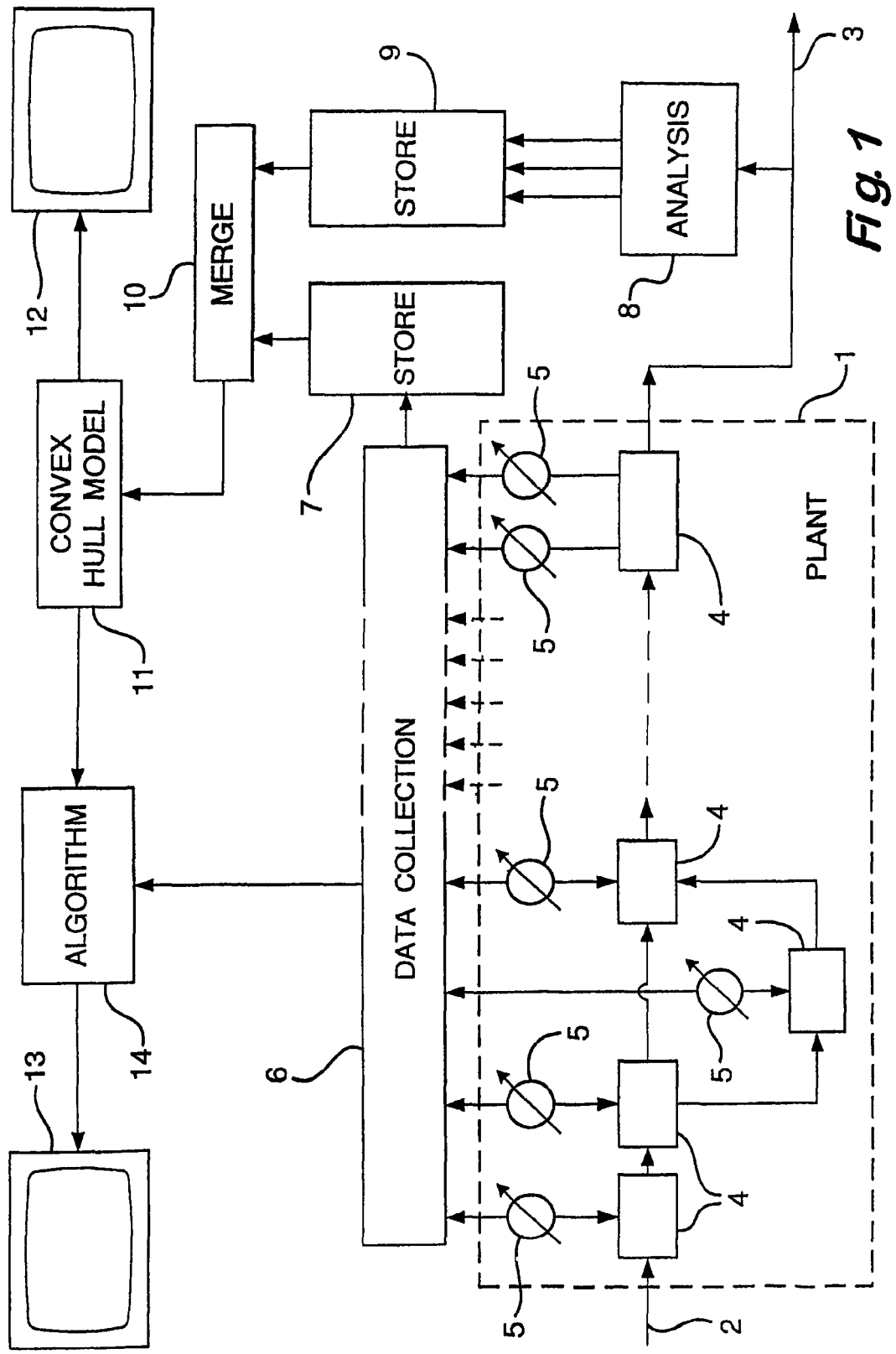
FIG. 1 is a schematic representation of a system according to the invention in the context of collection and utilisation of data derived from operation of a multi-variable processing plant during one of a succession of operational phases.

Referring to FIG. 1, the plant 1 has an input 2 and an output 3 between which there are, for example, a multiplicity of processing stages 4. The processing within each stage 4 is carried out in accordance with one or more variables that, in this example, are regulated by eleven controllers 5. The values of these variables for each operation or 'run' of the process are communicated to a data collection unit 6 to be accumulated in a store 7. The term 'run' in this context may refer to a discrete operation of the process during a first of several operational phases, but it may also refer to what applies at a discrete point in time within continuous operation.

The outcome at the output 3 of each run of the process, is submitted to a unit 8 for analysis in respect of its quality as determined in this example according to three variables. The values of these three quality variables are accumulated in a store 9, so that each run of the process and its outcome is defined by an accumulated set of control values in the store 7 and quality values in the store 9.

As the process is run again and again, a multiplicity of different sets of values is accumulated. Each set of values ('dataset') is made up of a plurality of sub-sets of data accumulated during the different phases of each run. The sub-sets for the different phases are distinguished from one another by the 'value' of a phase-number variable attached to them in the respective dataset.

A selection is made from the multiplicity of datasets accumulated to provide a historical record in the stores 7 and 9 of successive runs representing satisfactory operation of the process. This record is used in the method of the present invention as a basis for selection of the values of the various variables appropriate during the successive phases of the process, to achieving a particular, successful outcome.

The values of each individual dataset held in the stores 7 and 9, are brought together in a merge unit 10 and each scaled to the range 0 to 1. The scaled values are then processed in a unit 11 to plot them in an electronic display unit 12. The scaled values of each dataset are plotted in multi-dimensional space using a system of parallel coordinates as illustrated in FIG. 2, which shows by way of example, the situation in which the fourteen control and quality values are plotted for one of the phases of the process, but not all fourteen will be valid or meaningful in all phases.

Figure 2:
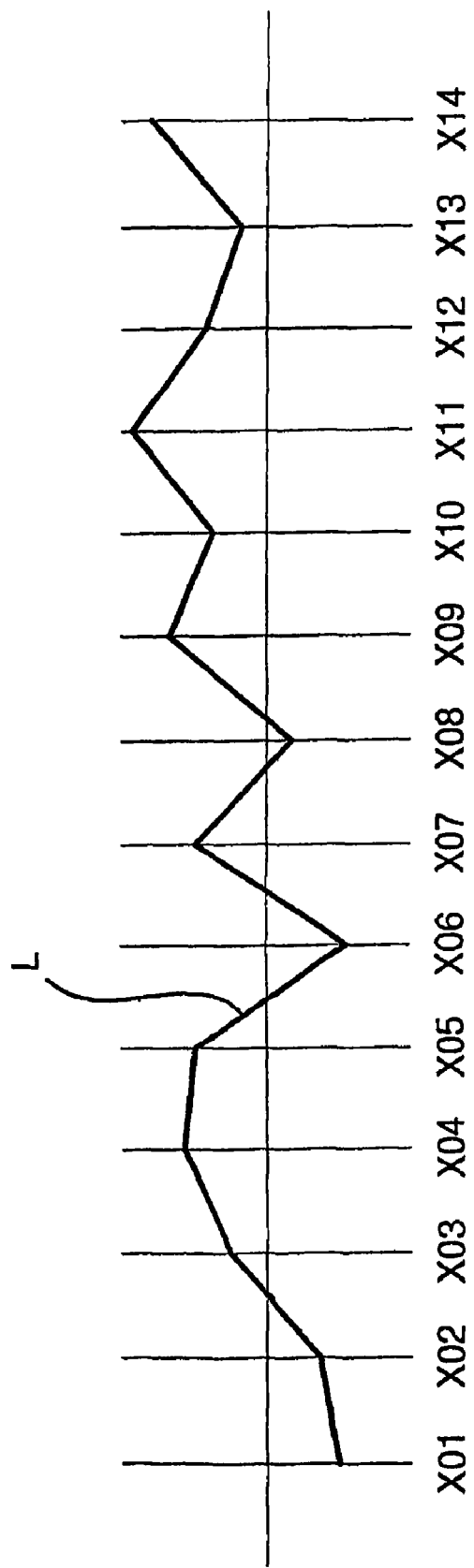
FIG. 2 is illustrative of a plot in multi-dimensional space defined by parallel coordinate axes, of operation of the multi-variable processing plant of FIG. 1 during said one phase.

Referring to FIG. 2, the fourteen values are plotted on fourteen equally-spaced, parallel axes X01-X14 representing the fourteen variables respectively. The first three axes, X01-X03, are used for the quality variables, and the plots are joined up to form a polygonal line L that is representative of the single fourteen-value operating point of the process. The other sub-sets of process values for the same phase are each correspondingly plotted against the same axes X01-X14 resulting in a multiplicity of polygonal lines corresponding to the line L; this is illustrated in part in FIG. 3. Each polygonal line is representative for the respective phase of an individual operating point or run of the process taken from the historical record.

Figure 3:
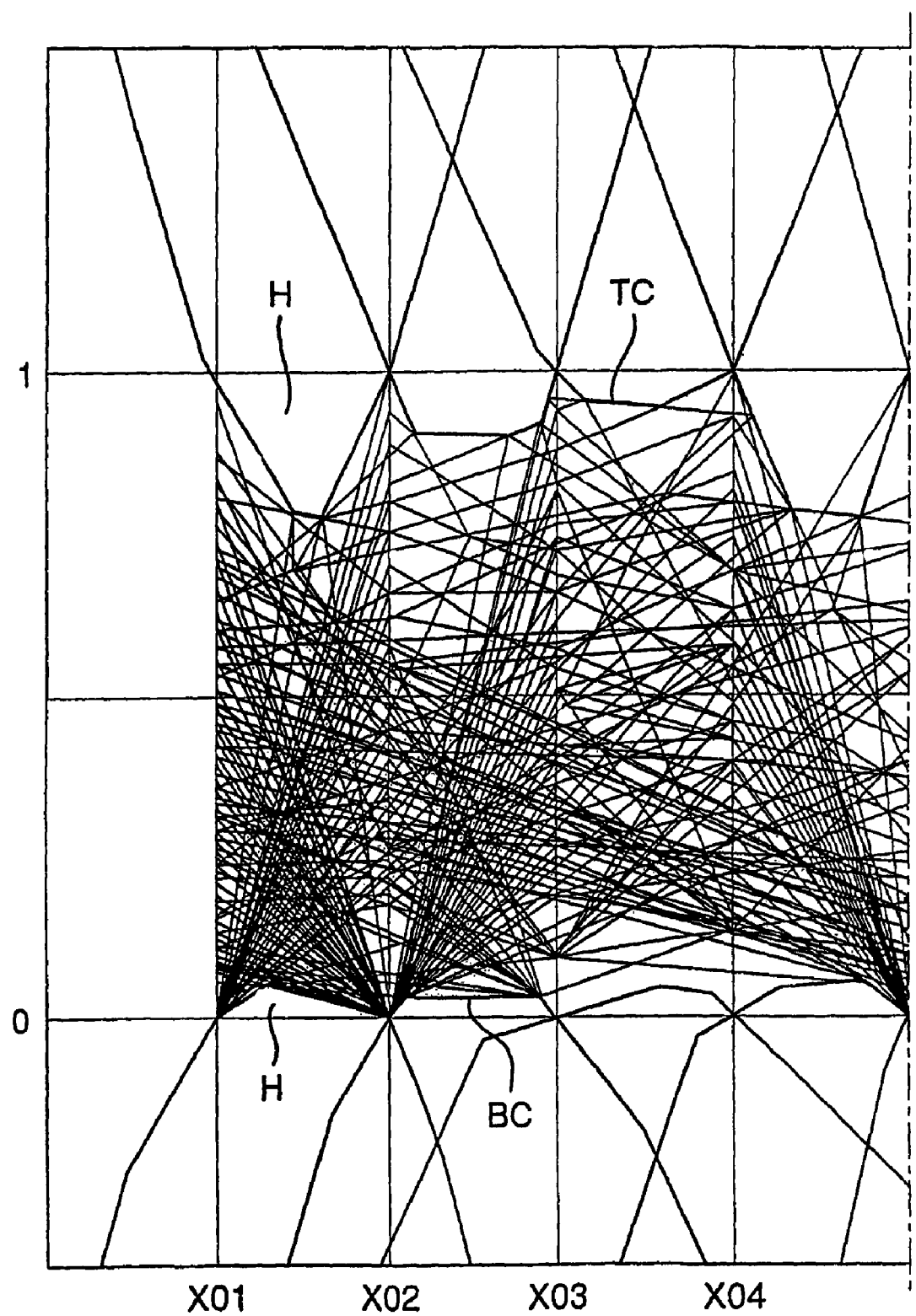
FIG. 3 shows in part a multiplicity of plots corresponding to that of FIG. 2 resulting from successive operations of the multi-variable process in said one phase.

Referring further to FIG. 3, convex hulls H for all pairs of adjacent variables of the parallel-axis system, are calculated in the unit 11 (although convex hulls are used in the present example, other forms of envelope may be adopted). Between each pair of adjacent axes X01-X14 there will be an upper and lower hull H defining upper and lower limiting boundaries between those two axes, of the operating-point lines. The upper and lower hulls H of the successive pairs of adjacent axes join together to define top and bottom bounds or chains TC and BC respectively. The convex hulls applicable to all other pairings of variables are also calculated. The calculation is carried out for each separate phase, so a sub-set of envelopes is generated for each sub-set of each dataset accumulated in the stores 7 and 9.

Figure 4:
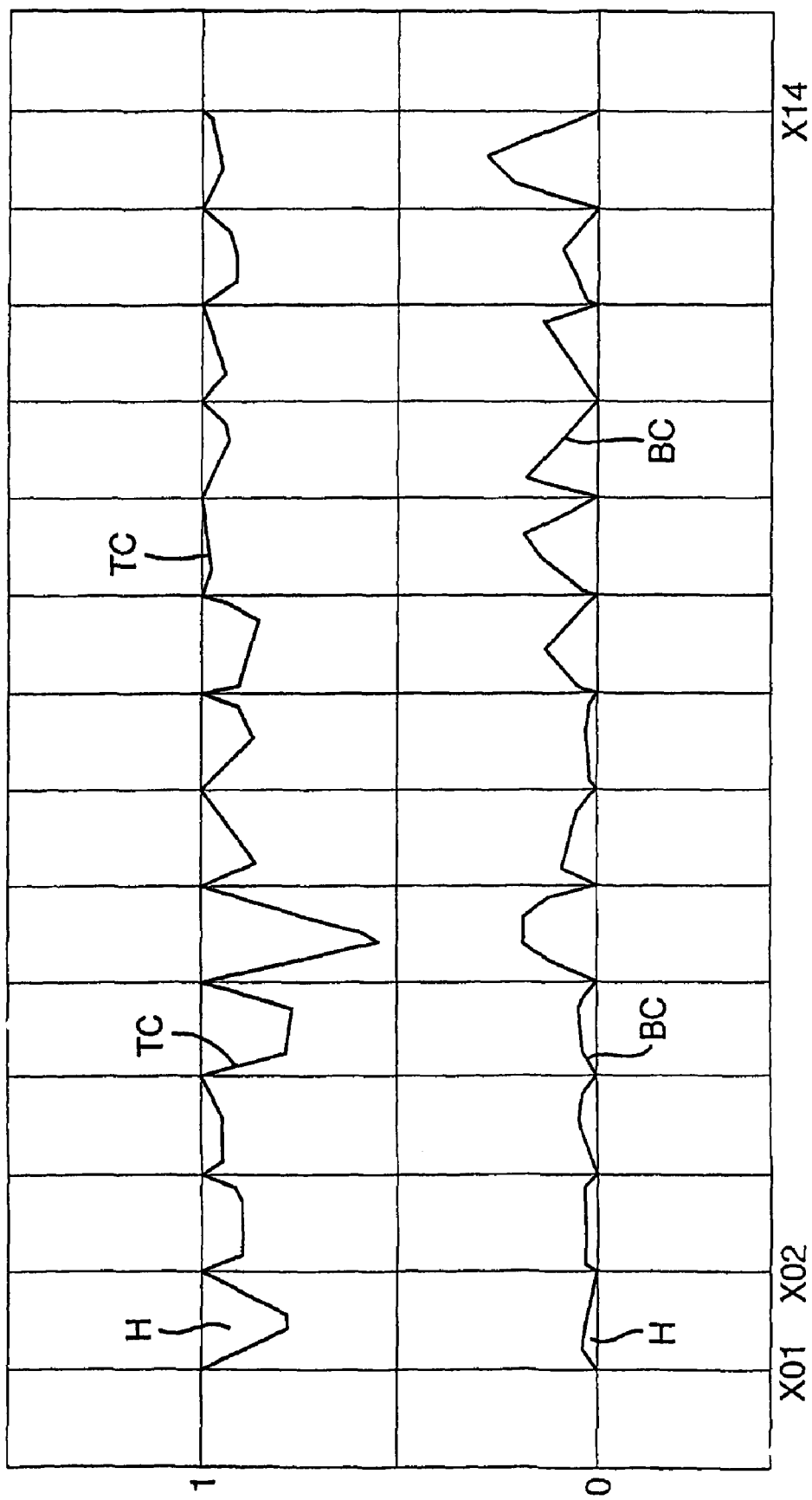
FIG. 4 is illustrative of the display of convex hulls in the system of FIG. 1.

Once the calculation of all the convex hulls for each individual phase has been completed, the upper and lower hulls H between adjacent axes, restricted for simplicity to those parts lying within the range 0 and 1, are communicated to the unit 12 for display in respect of that phase as illustrated by FIG. 4. The upper and lower hulls H between adjacent axes are represented in the display as joining up together as top and bottom chains TC and BC respectively, which define (for example, in colour red) the upper and lower boundaries of a region within which feasible operation of the process can take place. Clearly, the larger the number of historical sets of operational data used, with as wide as possible range of values for the individual variables, the more accurately will this region be defined.

The system also operates to determine appropriate warning alarm levels on plant variables for each successive phase of process operation, and to display these alarm levels and the current values of the corresponding variables to the process operator. This is achieved as illustrated in FIG. 1, using a further electronic display unit 13, however, it is possible for the functions of the units 12 and 13 to be combined into one unit. The display unit 13 is driven from an algorithms unit 14 in accordance with data from the unit 11 and the values of the process variables in real time, supplied from the unit 6.

Whenever a new set of values for the process variables is received, the unit 14 determines which, if any, of the variables have values lying outside a region or zone defined intermediate the top and bottom chains TC and BC of the relevant phase. The top and bottom chains TC and BC are defined by the convex hulls applicable between the variables of adjacent axes, but the convex hulls between all the other pairings of variables calculated by the unit 11, overlap them so that there is in general a narrower region or zone within which successful operation can be expected to lie. This narrower zone, nominally the 'best operating zone' ('BOZ'), defines in relation to each variable the range of value which that variable may have due to the value of each other variable. Accordingly, the unit 14 determines in dependence upon data received from the unit 11, the upper and lower limits of these ranges, and whether the current value of any of the processing variables signalled from the unit 6 is outside the BOZ. If the current value of any variable is outside the BOZ, warning is given by indicating this condition in the display of unit 13 or otherwise, and action is taken to determine what change or changes are appropriate to correct the situation.

The display unit 13 provides representation of warning alarm limits for all variables of the current phase simultaneously. These limits are always calculated using the current values of all the other variables; no model-fitting or statistical assumptions are required, and it is to be understood that reference to 'current' values does not preclude the use of time-lagged values of some variables.

Figure 5:
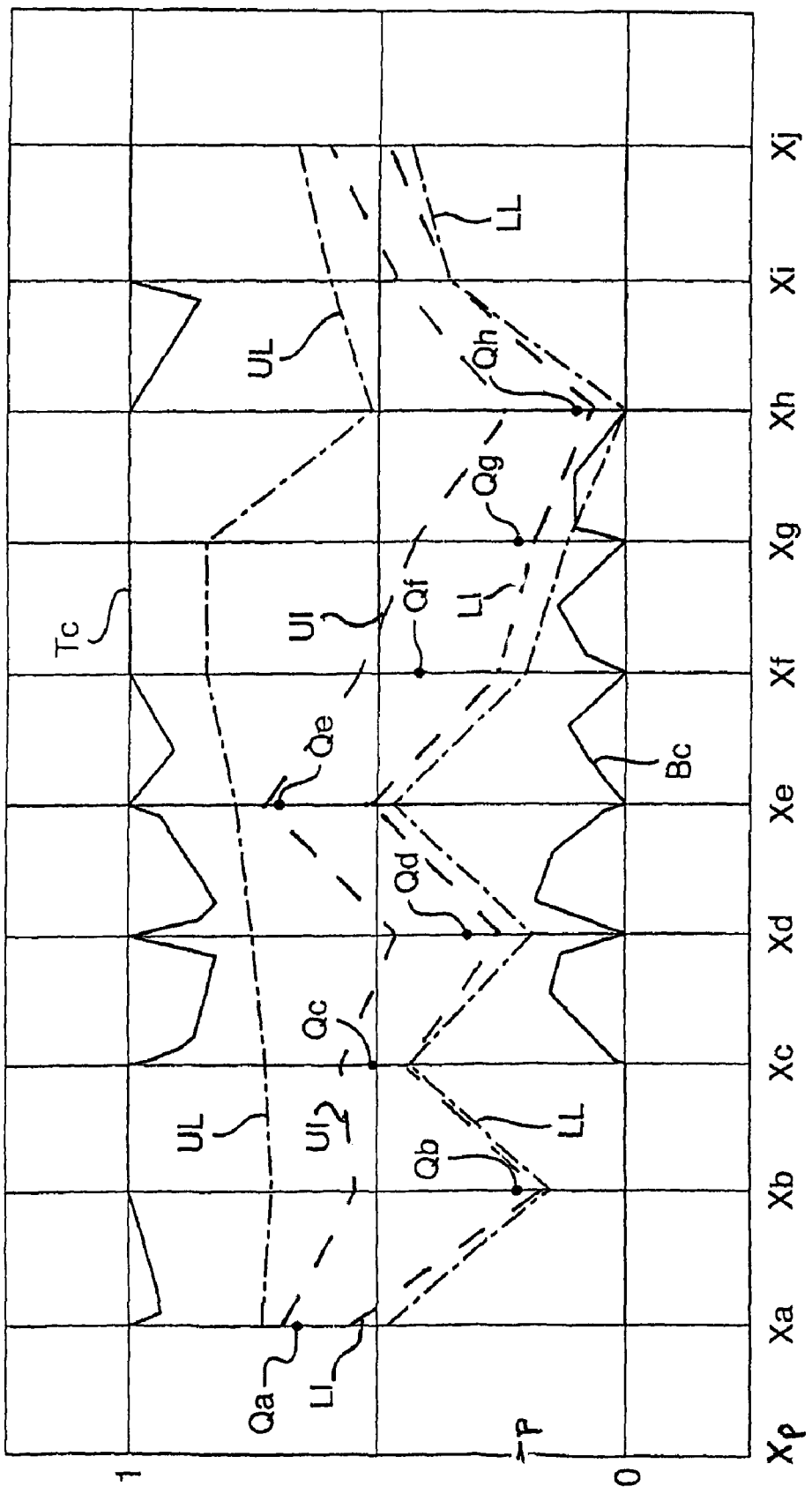
FIGS. 5 to 7 are illustrative of successive displays provided according to the invention in connection with operation of the method and system of the invention.
Figure 6:
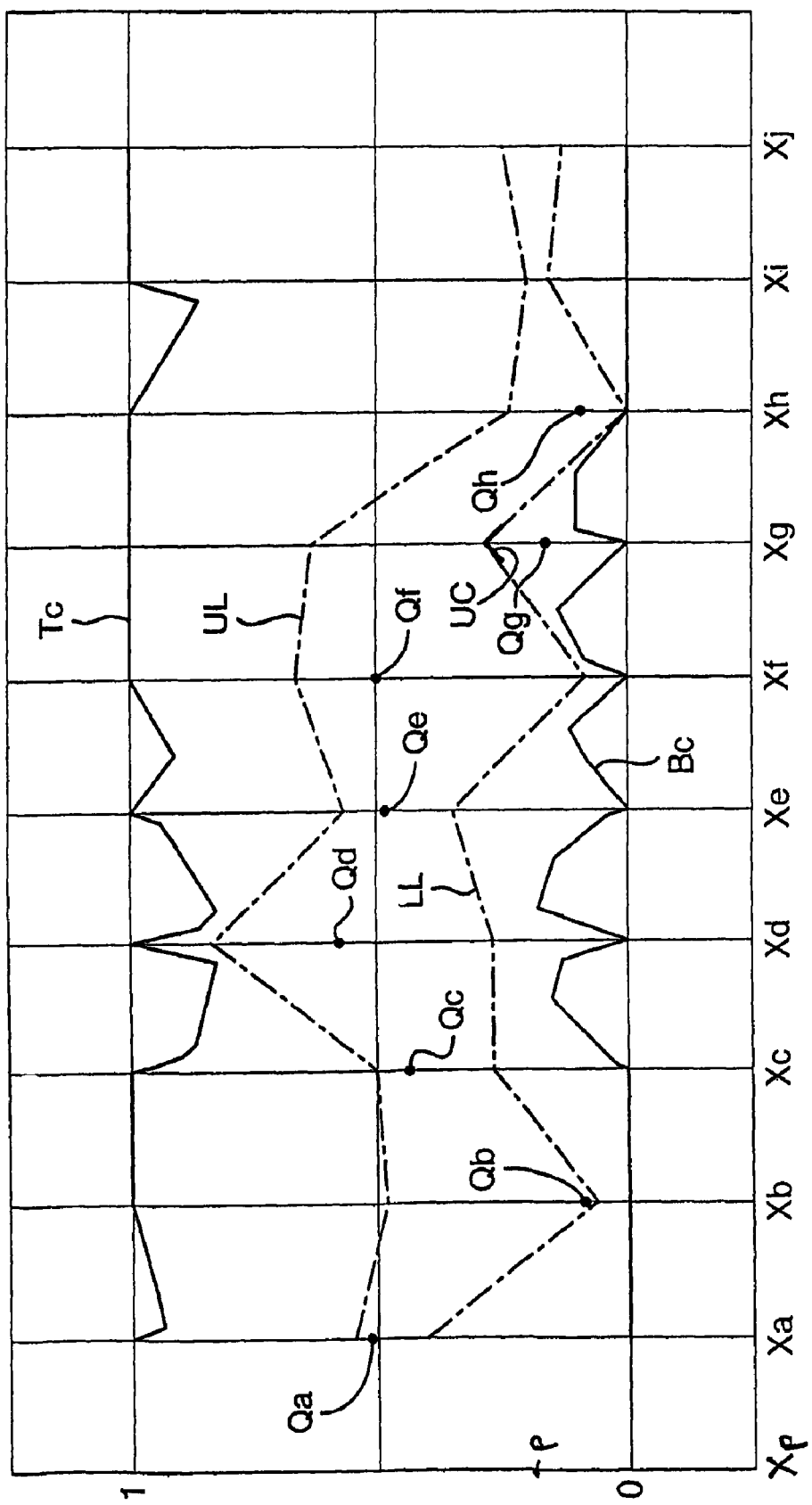
Figure 7:
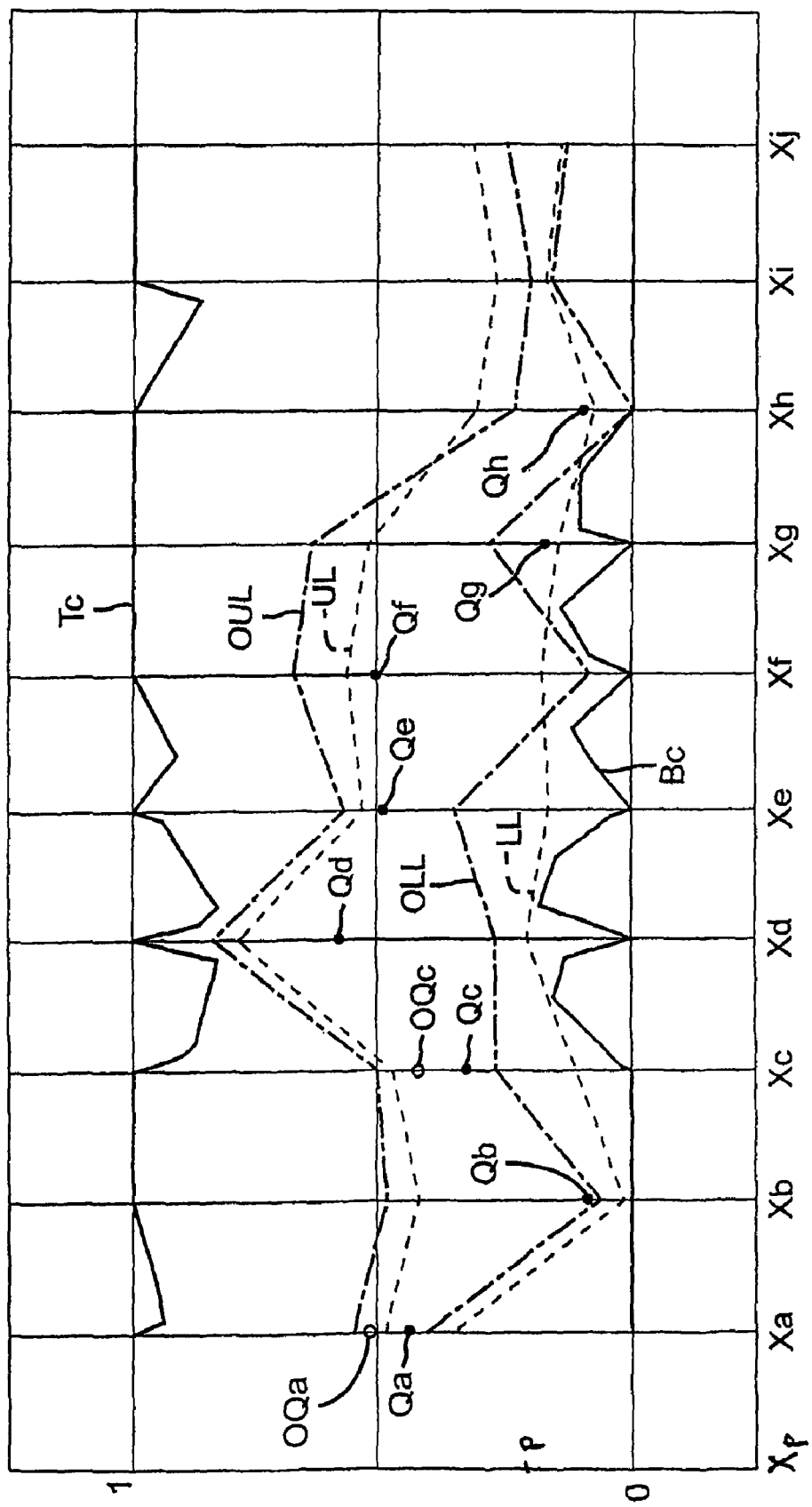

The general form of display provided by the unit 13 is illustrated in each of FIGS. 5 to 7, and the method of operation outlined above will now be described in relation to them during one phase of the multi-phase operation. The number of process variables displayed is dependent on which of the different phases of the process is current. For illustrative purposes, the current phase applicable in the case of FIGS. 5 to 7 is assumed to involve ten variables a-j, of which variables i and j are assumed to be quality variables and variables a-h process variables. Of the process variables, variables a-c are assumed to be manipulatable in the sense of being directly controllable in the current phase.

Referring to FIG. 5, the current values Qa-Qh of the process variables a-h derived from the unit 6 are plotted in the display of unit 13 against respective axes Xa-Xh of a system of ten parallel axes Xa-Xj. The phase-number p identifying the current phase is displayed on a further axis Xp to the left of the axis Xa. At the same time, upper and lower limits for the individual variables a-h calculated for the individual phase by the unit 14 are plotted on their respective axes Xa-Xh and joined up to provide polygonal, upper- and lower-limit lines UL and LL. The lines UL and LL delineate the applicable BOZ. Chains Tc and Bc (corresponding to chains TC and BC respectively of FIG. 4) and representing bounds defined by the convex hulls between the variables of adjacent axes are shown plotted in FIG. 5 (and also in FIGS. 6 and 7), but are optional.

The values of the quality variables i and j are assumed not to be available at the relevant run-time and so no values for them are plotted or shown in the display. However, upper and lower limits for each of them are calculated by the unit 14 from the current values of the process variables a-h. Although the requirement for the values of the process values a-h to be inside the BOZ sets ranges on the quality variables i and j, the ranges due to the current values of the process variables a-h, may be narrower than those specified in selecting the BOZ and hence give useful information.

As each new set of current values is received from the unit 6, the display changes, and the limits on all the variables are re-calculated and shown in the display of unit 13.

In the case illustrated in FIG. 5, the plotted values Qa-Qh are all within the current BOZ defined between top and bottom chains Tc and Bc respectively, but this is not so in the circumstances of the display illustrated in FIG. 6.

The circumstances of FIG. 6 are those in which the current values Qa-Qh have changed resulting in consequential re-location of the lines UL and LL. The changes have, for example, located the value Qb virtually on the line LL, but it together with each of the values Qa, Qc-Qf and Qh remain within the newly-applicable BOZ. The value of Qg plotted on the axis Xg is, however, below the lower limit LL, and the unit 14 in response to this signifies the existence of an alarm condition. In this respect and as at least part of the alarm condition, the unit 14 enters a caret (for example of colour red) in the display indicating where, and in which sense, the BOZ has been violated. More particularly, in this example, an upwardly-directed caret UC is displayed on the axis Xg where the line LL intersects that axis, to signify that the value Qg is either on or below the line LL. In the event that the value Qg had been on or above the line UL a similar, but downwardly-directed, carat would have been displayed on the intersection of the line UL with the axis Xg.

The process operator can interact with the display unit 13 to adjust one or more of the fixed values Qa-Qc up or down their respective axes experimentally, to see the effect this has on the limits of the other variables. When an alarm condition exists, and several variables are on or beyond their limits, adjusting the value of even one of them may be found to move the limit lines UL and LL outwardly from one another sufficiently to relieve the alarm condition on the others. Accordingly, using the on-line display of unit 13 in this mode, the operator can not only monitor the current settings and results of the process, but can also be made aware of alarm situations and receive guidance in focussed investigation of the remedial action necessary.

As well as identifying alarm conditions, however, the system is operable in a mode in which the unit 14 calculates a set of changes in the process variables that can be manipulated, in this example the variables a-c, which will clear the alarm condition. These changes can be displayed immediately to the process operator so that he/she may implement them; they may also, or alternatively, be communicated to a process controller for direct, automated implementation.

FIG. 7 shows the result of automatic operation of the system to calculate changes in the variables a-c which will be effective to clear the alarm condition represented in FIG. 6.

Referring to FIG. 7, the calculation carried out by the unit 14 in this example, determines that the optimum changes required to clear the alarm condition resulting from the current value of Qg outside the BOZ, is change in the values of variables a and c. More particularly, the changes required are reductions of the values of both variables a and c, and such changes are shown in the display by corresponding movements of the dot-representations of the values Qa and Qc to new locations on the respective axes Xa and Xc positions. The unit 14 in response to the change of values re-calculates the upper and lower limits of each variable and indicates them with fresh lines UL and LL in the display of unit 13.

The former values of the changed variables are retained as open-centre dots OQa and OQc, and the former limits applicable are shown as lines OUL and OLL, for reference purposes until the changes indicated have been implemented. It may even be useful to show the operator information about earlier time-steps. For example, the lines UL and LL could be faded rather than erased each time a new set of data is received, so that the display of the limits for one time-step would vanish over a pre-selected number of time-steps. Alternatively, depending on what the process operator found most useful, the area enclosed by the lines UL and LL might be filled in with solid colour (for example, lime green) that would be faded at each time-step, with the intensities due to a set number of time-steps up to the latest, being additive so that the part of the feasible region which has been feasible throughout the largest number of time-steps would have the most-intense colour.

It follows from what has been described and explained above that it would be necessary to have available within stores 7 and 9 a significant amount of historical operating data; such data is available from the data bases normally forming part of conventional process-instrumentation. Data collected over a number of different non-contiguous periods may be combined, and in some circumstances data generated by a mathematical model may be used.

Referring further to FIG. 1, the data collected comprises process data accumulated in store 7 and quality data accumulated in store 9. This data as merged in the merge unit 10, is examined to make a selection of all datapoints which are satisfactory in terms of the values of all the quality and process variables (a "datapoint" in this regard consists of a set of measurements of all process and quality variables made at one time; some variables may be time-shifted by a constant amount with respect to others). The operator makes the selection from a large set of historical operating data merged in the unit 10, that is to say, a large set of datapoints, representative of the full range of operation of the plant, and selects those that represent good operation. Good operation is typically defined by the values of a number of quality variables being within a specification, plus some other conditions such as limits on certain emissions from the plant, or on those emissions as a proportion of throughput. The selected datapoints constitute the BOZ dataset and form part of the input to the algorithm unit 14 from which the BOZ envelope (in this example represented by a two-dimensional convex hull) is calculated for display by the unit 13. The BOZ dataset remains stored in memory, and the BOZ envelope calculated at each time-step for the current values of the process variables is displayed by the unit 13 in the manner of FIGS. 5 to 7 to indicate the limits on the operating variables.

While the process is operating, the values of the quality variables accumulated in store 9 will in many cases not be available, as they are obtained from analysis of the product of the process. In this case the algorithms unit 14 uses only the process variables whose values are available in real time. Conceptually, the envelope of the BOZ in the multi-dimensional space defined by all the variables is projected into the multi-dimensional subspace defined by the process variables, and the process is required to remain within this projected envelope. This projected envelope is the envelope of the values of the process variables for all historical datapoints for which the values of the process variables and the values of the quality variables were satisfactory.

The algorithms unit 14 in the present context operates according to a control algorithm as well the alarm algorithm referred to above. A suitable algorithm for this purpose is described in GB-A-2 378 527. This uses a planar convex hull, but it would also be possible to derive a control algorithm from the constraints obtained by fitting any convenient closed hyper-geometric figure to the BOZ.

In the event that one or more alarms are identified from the alarm algorithm at a time-step, the control algorithm is operative to determine first whether any variables are outside their absolute limits. Absolute limits on variables apply regardless of the values of any other variables; absolute limits are shown by upper and lower horizontal lines '1' and '0' respectively of FIGS. 5 to 7 using separate envelopes for each phase. There are more restrictive absolute limits than those indicated by the horizontal lines, namely the maximum and minimum values in the BOZ dataset for the current BOZ. If any manipulated variables (a-c in the example of FIGS. 5 to 7) are outside their absolute limits, they will have to be moved within those limits as part of the alarm rectification, but if any non-manipulated variables are outside their absolute limits, the alarm cannot be fully rectified.

The present invention enables the process to meet "targets" on process variables; a "target" on a variable specifies that the value of that variable should not be below some greater-than-or-equal-to (GE) target value, and/or should not be above some less-than-or-equal-to (LE) target value. Targets, which are different from the BOZ, may not always be satisfied even during good operation, and they may be imposed on non-manipulated as well as manipulated variables. Control of the process consists of changes to the values of the manipulated variables only. These must be such as to cause the values of the non-manipulated variables to move into their targets in a time that depends on the process dynamics of the system.

Operation of the system in the above respect begins with selection of a subset of the datapoints in the BOZ dataset that have the current phase number and satisfy all the required targets. The selection is made automatically to form a target dataset, and the envelope of the target dataset is constructed within the unit 14 for display by the unit 13 as an inner envelope within the BOZ.

An example of an inner envelope as displayed by the unit 13 is illustrated in FIG. 5, the envelope in this case having upper and lower limits represented by the polygonal lines UI and LI respectively, within the limits UL and LL of the BOZ envelope. The values of all the process variables in this specific example lie within the inner envelope, but in general some will lie outside it and action will be required towards bringing them all within it.

The principle used is that if all the manipulated variables are moved inside the inner envelope the non-manipulated variables will follow. Accordingly, the system calculates the changes in the values of the manipulated variables required to bring them all inside the inner envelope, and displays these changes to the process operator via the display unit 13. The operator may implement these changes manually or they may be fed online to be implemented automatically, so that process operation is improved according to the user's target criteria. The improvement does not appear immediately but after a time which depends on the process dynamics and the control system.

An inner envelope may also be used to advantage where a non-manipulated variable is in alarm, and no moves of manipulated variables can be found that will move its limits out to include its current value. In these circumstances, the inner envelope is used to find moves of manipulated variables that will cause the value of the non-manipulated variable to move inside its violated limit. As the limit cannot be changed by moving manipulated variables, it is treated for this purpose as though fixed, and a working target is set on the non-manipulated variable that is in alarm. If its upper limit is violated, an LE target value equal to the value of the upper limit minus a suitable quantity, is set, whereas if the lower limit is violated, the setting is of a GE target value equal to the value of the limit plus the same quantity. The moves of the manipulated variables that will cause the value of the alarmed non-manipulated variable to move to the working target are then calculated using an inner envelope in the same way as moves to bring a manipulated variable to a specific target are found as described above. As before, the changes required to bring about these moves are displayed to the operator, and may be implemented by him/her manually or automatically. In either case the result is that the values of the non-manipulated variables that are in alarm change in due course to clear the alarms.

The method and system of the invention also provides for optimisation of the process and quality variables during each phase. This is of advantage in those circumstances where the process is required to run with the value of a process variable as high as possible or as low as possible, or where the value of a process variable is required to be as high as possible provided it does not exceed some LE target value, or as low as possible provided it does not fall below some GE target value. If there are non-manipulated process variables to be maximised or minimised, then a dynamic inner envelope is used. For each non-manipulated variable to be maximised a top limit is either the current upper limit on that variable due to the BOZ and the values of the other process variables, or the LE target value of that variable if it exists. The bottom limit for that variable in the inner envelope starts at its current value. Similarly, for any non-manipulated variable to be minimised the top limit is its current value and its bottom limit is either its current lower BOZ limit or its GE target value if any.

The subset of datapoints selected for calculation of the inner envelope in this case are the datapoints of the BOZ dataset for the current phase, which are within the limits on the non-manipulated variables that are to be maximised or minimised. The inner envelope calculated from these datapoints is then shrunk by raising the bottom limits on the non-manipulated variables to be maximised and lowering the top limits on the non-manipulated variables to be minimised, until the envelope cannot be shrunk any further. This latter condition is reached when further shrinking would lead either to there being too few datapoints of the original selection remaining from which to construct the inner envelope, or to one of the manipulated variables being kept outside the shrunk inner envelope by its current BOZ limits. The fully-shrunk inner envelope is displayed to the process operator via the unit 13 together with the changes in the values of the manipulated variables required to bring them into the envelope. The required changes may be implemented manually by the operator or they may be fed online to be implemented automatically, with the result that after a time which depends on the process dynamics and the control system, the values of the variables to be maximised increase and those of the variables to be minimised decrease.

If a manipulated variable is to be maximised or minimised, the inner envelope provides limits on how far it can be moved without an adverse effect on the non-manipulated variables to be optimised.

A further feature of the invention lies in automatic 'tightening' of the BOZ envelope. If process operation consistently outperforms the original BOZ criteria then a subset of the BOZ dataset is selected to define an inner envelope that is to act effectively as a new BOZ, and a maximum-acceptable alarm rate is specified. The new BOZ is selected such that, had it been in use for the last n sets of process-variable values, where n is an integer appropriate to the process, the number of those sets of process-variable values for which there were alarms would not have exceeded the specified maximum. The effect of this is that so long as the process is kept within the limits due to the new BOZ, process operation is improved compared with remaining within the wider, old BOZ. This facility provides for continuous improvement as the process and its operator learn to stay within each successively tighter BOZ.

Figure 8:
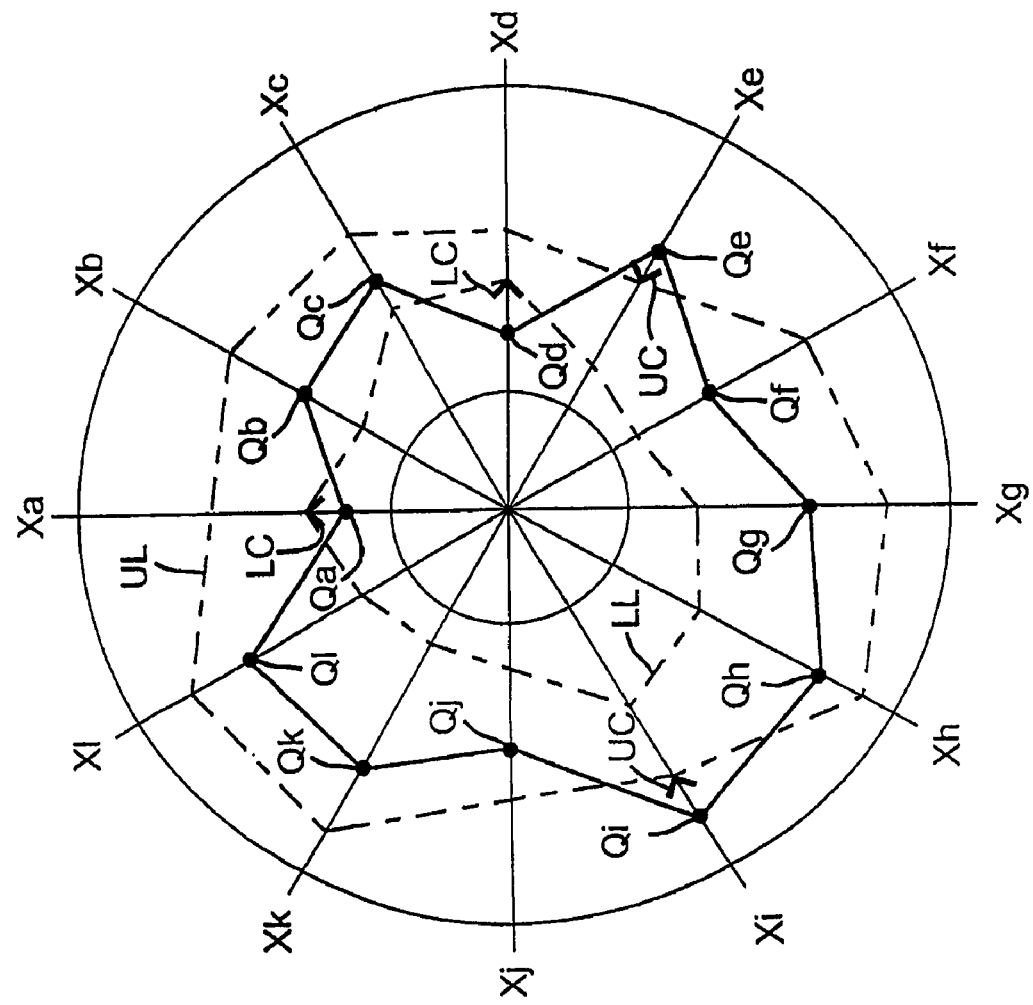
FIG. 8 shows an alternative form of display representation that may be used in the method and system of the invention.

The display of BOZ envelopes, inner envelopes, alarms and recommended process movement as described above may also, or as an alternative, be displayed on a circular plot (sometimes known as a 'radar plot' or 'spider diagram') rather than in the linear forms illustrated in FIGS. 5 to 7. In this case the axes are arranged as the spokes of a wheel with equal angles between them, as illustrated in FIG. 8 for a circular plot of twelve variables Xa-Xl. An indication of the current phase number is provided also, either as a general indication or on a thirteenth axis (not shown). All calculations are performed using the parallel coordinate system, it being the display alone that is transformed to circular form.

Referring to FIG. 8, polygonal lines UL and LL (for example in green, represented here in dashed line) show the current upper and lower limits respectively on the variables. In this case the lines UL connecting the upper limits form a closed figure, as do the lines LL connecting the lower limits. Dots Qa-Ql (for example in blue) representing the current values of the process variables are joined by a solid (blue) line to assist the operator to recognise the 'shape' of the current operating point. Where a variable is outside its limits a caret (for example in red) appears at the violated limit, a caret UC (as illustrated for axes Xe and Xi) where the upper limit UL is violated and a caret LC (as illustrated for axes Xa and Xd) where the lower limit LL is violated. The operation of the system to calculate and indicate the corrections required to rectify the alarm condition indicated by the display of FIG. 8, and to utilise inner envelopes, is unchanged with this form of display.

The method and system of the present invention have been described in detail more especially in respect of operation during one of a plurality of phases. The same general operation is applicable during the other phases of the overall process, but the linking together of these different-phase operations to run as an integrated whole has significant advantages. Those advantages are achieved simply by including the phase number in the data of each datapoint. This allows the separation of the accumulated data according to relevant phase to be readily carried out and transition from one phase to the next to proceed automatically.

In the method and system described above where a separate set of two-variable convex hulls is calculated for each phase, the display provided at any one time by the display unit 13 represents the situation applicable to the one, current phase. As an alternative, one set of two-variable convex-hull envelopes may be calculated covering all (or possibly, a selection of) the phases of the process operation, and in these circumstances the phase numbers are used to select the parts of the envelopes relevant to the current phase.

The invention claimed is:

1. A method for control of a multi-variable process throughout a plurality of successive, distinct phases of the process, comprising:
(a) the step of accumulating sets of values of process and quality variables from previous multiple operations of the process through all the plurality of phases, the sets of values being accumulated as respective datasets of a historical record, each dataset comprising a plurality of sub-sets of data individually identified respectively with the plurality of phases of the process;

(b) determining which of the plurality of phases is a current phase of the process;

(c) deriving an operational envelope in respect of the current phase, the operational envelope being derived from sub-sets of data which are individually identified in the datasets of the historical record with the current phase;

(d) indicating on respective axes of a multi-dimensional display representation current values of the process variables within the current phase of the process, the current values of the process variables within the current phase being indicated on their respective axes of the multi-dimensional display representation;

(e) indicating the operational envelope against the respective axes of the multi-dimensional display representation to define bounds for values of the process variables within the current phase; and (f) controlling the process successively through individual phases of the plurality of phases in dependence upon the bounds defined by the operational envelope for values of the process variables within the current phase.

2. The method according to claim 1, wherein each dataset accumulated in the historical record includes an identifier of the phase to which the dataset relates.

3. The method according to claim 2, wherein the operational envelope for each individual phase is derived from the datasets of the historical record that include the identifier of that respective phase.

4. The method according to claim 2, wherein the operational envelope for each individual phase is a respective part of an envelope derived from the datasets of the historical record applicable to one of all the phases and a selection of the phases of the process.

5. The method according to claim 1, wherein an indication of which phase of the process is current is indicated on a respective axis of the multi-dimensional display representation.

6. The method according to claim 1, wherein the operational envelope is a convex hull.

7. The method according to claim 1, wherein the bounds define as between process variables of adjacent ones of the axes, upper and lower limits for the values of those respective process variables.

8. The method according to claim 1, wherein the axes of the multi-dimensional display representation are parallel to one another.

9. The method according to claim 1, wherein the axes of the multi-dimensional display representation are spaced from one another angularly.

10. The method according to claim 1, wherein the operational envelope which defines bounds for the values of the process variables within the current phase also defines bounds for quality variables within the current phase.

11. A system for control of a multi-variable process throughout a plurality of successive, distinct phases of the process, comprising:

(a) means for accumulating sets of values of the process and quality variables from previous multiple operations of the process through all the plurality of phases, the sets of values accumulated being respective datasets of a historical record each dataset comprising plurality of sub-sets of data individually identified respectively with the plurality of phases of the process;

(b) means for determining which of the plurality of phases is a current phase of the process;

(c) means for deriving an operational envelope in respect of the current phase, the operational envelope being derived from sub-sets of data which are individually identified in the datasets of the historical record with the current phase;

(d) means for indicating on respective axes of a multi-dimensional display representation current values of the process variables within the current phase of the process, the current values of the process variables within the current phase being indicated on their respective axes of the multi-dimensional display representation;

(e) means for indicating the operational envelope against the respective axes of the multi-dimensional display representation to define bounds of the current for values of the process variables within the current phase; and (f) means for controlling the process successively through individual phases of the plurality of phases in dependence upon the bounds defined by the operational envelope for values of the process variables within the current phase.

12. The system according to claim 11, wherein each dataset accumulated in the historical record includes an identifier of the phase to which the dataset relates.

13. The system according to claim 12 wherein the operational envelope for each individual phase is derived from the datasets of the historical record that include the identifier of that individual phase.

14. The system according to claim 12, wherein the operational envelope for each individual phase is a respective part of an envelope derived from the datasets of the historical record applicable to one of all the phases and a selection of, the phases of the process.

15. The system according to claim 11, wherein an indication of which phase of the process is current is indicated on a respective axis of the multi-dimensional display representation.

16. The system according to claim 11, wherein the operational envelope is a convex hull.

17. The system according to claim 11, wherein the bounds define as between process variables of adjacent ones of the axes, upper and lower limits for the values of those respective process variables.

18. The system according to claim 11, wherein the axes of the multi-dimensional display representation are parallel to one another.

19. The system according to claim 11, wherein the axes of the multi-dimensional display representation are spaced from one another angularly.

20. The system according to claim 11, wherein the operational envelope which defines bounds for the values of the process variables within the current phase also defines bounds for quality variables within the current phase.

* * * * *